United States Patent
Browning

[15] 3,691,743
[45] Sept. 19, 1972

[54] SCRAPING BLADE ATTACHMENT FOR A RAKE

[72] Inventor: Espey T. Browning, 5700 Nicholson St., Riverdale, Md. 20840

[22] Filed: March 5, 1971

[21] Appl. No.: 121,341

[52] U.S. Cl. ............................................56/400.05
[51] Int. Cl. ...............................................A01d 7/10
[58] Field of Search.........56/400.04, 400.05, 400.06, 56/400.07; 37/53

[56] References Cited

UNITED STATES PATENTS

| | | | |
|---|---|---|---|
| 3,397,469 | 8/1968 | Browning | 56/400.04 X |
| 2,114,394 | 4/1938 | Lines | 56/400.06 |
| 2,114,518 | 4/1938 | Bayliss | 56/400.05 X |
| 2,637,261 | 5/1953 | Wale | 56/400.05 X |

Primary Examiner—Louis G. Mancene
Assistant Examiner—J. A. Oliff
Attorney—Shoemaker & Mattare

[57] ABSTRACT

A scraping blade attachment for use on any conventional hand rake, regardless of the spacing of tines thereon, wherein said scraper blade has a head or top portion with slot or openings therein, said openings being such as to receive the tines of different rakes therethrough and each of said rakes having a different number and spacing of tines thereon to hold the scraper blade attachment to the rake in a secure manner.

1 Claim, 5 Drawing Figures

PATENTED SEP 19 1972 3,691,743

INVENTOR
ESPEY T. BROWNING

BY *Shoemaker & Mattare*

ATTORNEYS

SCRAPING BLADE ATTACHMENT FOR A RAKE

BACKGROUND OF THE INVENTION

This invention relates to a device for scraping up snow or the like and is directed particularly to an improved device of this kind for scraping up or moving snow on the surface of the ground for clearing pavements, driveways and other surfaces and more specifically is directed to a scraper blade attachment for use with a rake, wherein the scraper blade is removably attached to the rake for moving snow or the like by pulling on the rake in the usual manner. The scraper blade attachment has means whereby the blade may readily be attached to different rakes regardless of the spacing of the tines thereon.

OBJECTS OF THE INVENTION

The present invention has for an object to provide a novel attachment for a conventional garden rake or the like for scraping snow or other loose material from a surface such as a pavement, walkway, driveway or the like, wherein the attachment may be readily coupled to different rakes regardless of the number spacing of tines thereon.

Another object of the invention is to provide a device of the character aforesaid which when combined with a garden rake or the like results in a light weight implement which substantially reduces the effort required in the performance of the operation of the implement over prior art devices.

A further object of the invention is to provide a snow blade attachment for a conventional garden rake which is simple in construction and which when removed from the rake can be easily stored and can be accordingly readily shipped in quantities.

An even further object of the invention is to provide a snow blade attachment for different conventional garden rakes which is relatively inexpensive to manufacture and which can be fabricated from aluminum or other metals or alloys, plastics, fiberglass and the like.

A still further object of the invention is to provide a scraper blade attachment for a garden rake which has a novel means whereby the scraper blade can be readily attached to and removed from the tines of the rake without necessitating the use of tools or other devices for effecting the attachment.

An even more specific object of the invention is to provide a scraper blade attachment for a conventional hand-held garden rake or the like wherein the scraper blade includes means for effecting a secure frictional engagement with the tines of the rake and wherein the scraper blade includes means whereby many different types of rakes having different spacing and numbers of tines thereon can be readily attached to the scraper blade.

DETAILED DESCRIPTION OF THE INVENTION

Figure 1:
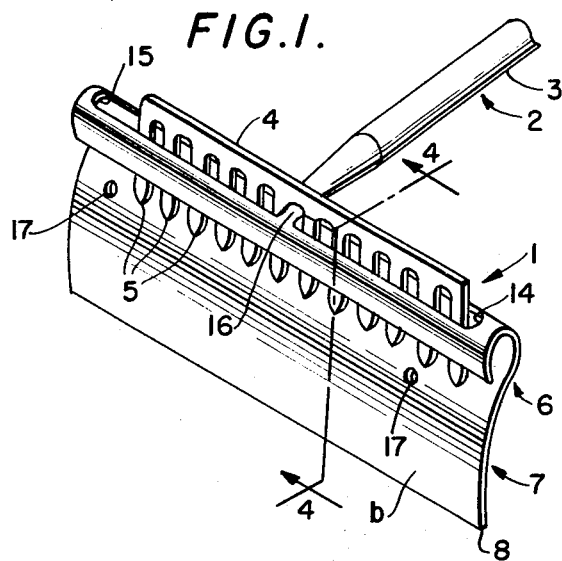
FIG. 1 is a perspective view of the scraper blade attachment and a rake coupled together for use.
Figure 2:
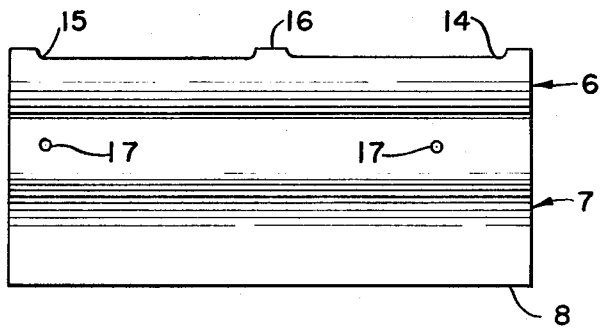
FIG. 2 is a rear or back elevational view of the scraper blade attachment showing the longitudinal slots or horizontally aligned elongated openings in the top or head portion thereof for receiving the tines of the rake and additional openings or apertures for receiving additional attachment means for securing the scraper blade respectively to different rakes.
Figure 3:
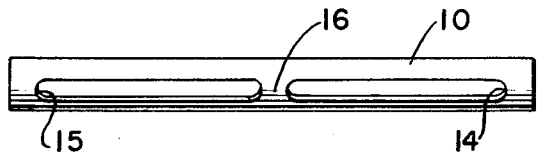
FIG. 3 is a top view of the scraper blade showing the longitudinal slots therein.

Referring now to the drawings, wherein like reference numerals refer to like parts throughout the several views, the scraper blade attachment is indicated generally at 1 in FIG. 1 coupled to a conventional garden rake or the like indicated generally at 2.

The rake 2 is of conventional construction and has a handle 3 of wood, plastic, metal or the like to the forward end of which is attached a steel bar 4 having a plurality of generally parallel, spaced apart tines extending laterally therefrom.

The scraper blade attachment 1 comprises a body of sheet material formed to define a top part or top portion, generally designated 6, and a major lower portion which comprises a body of the blade, generally designated 7. The bottom portion 7 of the scraper blade has a straight longitudinal bottom edge 8 which may be slightly beveled or sharpened, if desired.

The blade has a front side or surface $a$ and a rear side or surface $b$, the major lower portion of the blade having a slightly transversely arcuate shape with the front side being the concave side.

The upper portion of the blade body 7 merges into a forwardly curving high breast portion 9 which has a relatively short radius arc and which merges into a lower forward part of a transversely rounded head 10 which comprises the top portion 6 of the blade structure.

The head 10 is shown and described as tubular and approximately circular in cross-section, but it may assume other shapes, such as elliptical or oval or the like or it may comprise a flange or offset portion or the like at the top of the blade. Further, the head preferably comprises a continuation or integral part of the blade body, but it may be a separate part fastened thereto, if desired.

The wall of the head portion 10 extends upwardly and forwardly from the breast portion 9 in a steady curve which swings rearwardly at the top most part of the head and then continues downwardly into a lower, forwardly directed quarter portion 11 which terminates in a downwardly and forwardly directed a free edge 12.

Figure 4:
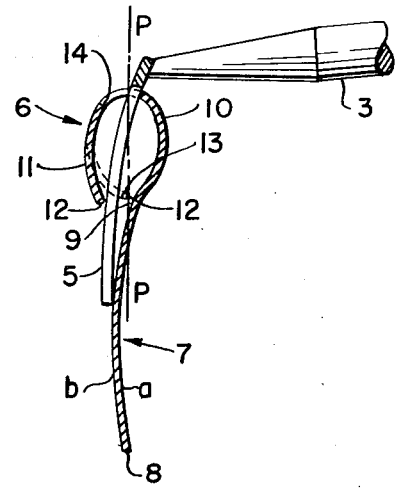
FIG. 4 is a transverse sectional view taken along line 4—4 in FIG. 1, showing the manner in which the front portion of the head or top of the blade flexes to make secure frictional engagement with the tines of the rake.
Figure 5:
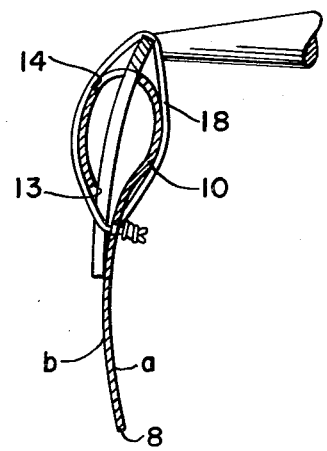
FIG. 5 is a transverse sectional view similar to FIG. 4 showing the scraper blade attachment in position on a rake with additional securing means for holding the scraper blade to the rake.

As seen in FIGS. 4 and 5, the free edge 12 of the quarter portion 11 is cut square, thus producing forward and rearward relatively sharp corners, with the forward corner being indicated at 13.

The free edge 12 of the head 10 is normally directed downwardly and forwardly toward the upper part of the breast portion 9 of the blades and is spaced closely adjacent thereto as shown in phantom lines in FIG. 4.

A pair of longitudinally extending, spaced elongated substantially horizontally aligned openings or slots 14 and 15 are formed in the extreme top part of head 10 and extend the major portion of the length thereof, terminating at their outer ends short of the outer most ends of the scraper blade 1 and terminating spaced apart at their inner ends to define a relatively narrow dividing portion or web 16 between the rear, curved quarter portion 11 and the front curved portion of the head 10 and thus the openings are each closed at their respective ends.

As seen in FIG. 4, the openings or slots 14 and 15 are formed in the head spaced slightly forwardly of the vertical longitudinal plane indicated at P—P. The slots or openings 14 and 15 are in an extreme top portion of the head 10 and are equidistantly horizontally spaced in the head 10 so as to give a balanced weight to the device when the blade is attached to a rake as shown.

The longitudinally extending aligned slots or openings 14 and 15 in the extreme top portion of the head 10 enable any make of different conventional steel rake to be used with the scraper blade attachment since the slots will accommodate the various spacings and numbers of tines encountered in different makes of steel rakes commercially available.

When the scraper blade attachment 1 is coupled to a rake 2, the points or ends of the tines 5 will press against the upper part of the rear portion of the rear side of the lower portion 7 of the scraper blade at the lower part of the breast 9, and the lower terminal edge 12 of the forward quarter portion 11 of the head 10 will resiliently engage against the rear side of the tines 5. The lower most quarter portion is sprung rearwardly from the plane P—P, as seen in FIG. 4, when the tines 5 are inserted through the openings 14 and 15, so as to frictionally and resiliently hold the scraper blade 1 to the tines of the rake.

The rake tines will be pressed more firmly against the rearward side of the blade body 7 as the device is used since a forward pull on the rake causes the bottom edge 8 of the blade body to drag over the surface against snow or like material, and to thus press the blade rearwardly against the tines.

When the blade body is lifted for the purpose of making another stroke for moving snow or other material, the tensioned edge portion 12 of the head 10 will hold the tines firmly in position and thus prevent the blade from dropping off. This action is more firmly effected by the engagement of the corner 13 on edge 12 with the tines, the sharp corner tending to bite into the metal of the tines and thus resist any tendency of the latter to slip or move upwardly relative to the blade.

While the above-described construction of the blade is such as to maintain a tight connection between the same and the tines of the rake, the blade may be more permanently secured to the rake, if desired, so that it cannot be accidentally knocked loose or dislodged from the tines by being struck against a fixed object.

In the use of a device of this kind around gates, porch railings or other such places, there is always the possibility, in raising the blade from the snow to reposition it for making another stroke, of hitting the top of the blade against the railing or other object with sufficient force to break the attachment between the blade and the tines and dislodge the blade from the rake. In order to avoid the possibility of this happening, a pair of apertures 17 are formed through the blade body 7 adjacent the opposite ends thereof for receiving additional securing means such as a wire, rope or other material 18 therethrough extended around the bar 4 of the rake and between the tines 5 to securely fasten the scraper blade to the rake. Thus, a very quick and easy way of fixing the blade to the rake is provided if such should be desired, and likewise, the blade can quickly be taken off or removed from the rake when it is no longer needed.

While only two apertures 17 have been illustrated and described for receiving wires or the like to secure the blade to the rake head, additional apertures could obviously be provided in the blade for the use of additional securing wires or the like if this should be desirable.

The scraper blade attachment may be made from any suitable material such as aluminum or other metals, plastic, fiberglass, or the like, and may be molded, pressed or otherwise formed from a single sheet of such material, as desired. Further, the blade preferably has a length at least equal to, and desirably greater than, the length of a row of tines on which the blade is attached.

One important aspect of this invention is the provision of a means thereon, such as the slot means in the head of the blade, whereby any rake is useable therewith regardless of the spacing of tines thereon.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. An elongated rectangularly shaped scraper blade with a bottom edge and a tubular top head for attachment to hand-held rakes, each of which rakes has a different number and spacing of its tines thereon, the tubular top head being coextensive with the length of the blade at its top, the tubular top head having an extreme top portion with two closely spaced apart elongated aligned horizontally extending closed end slots in a major portion of the length of said extreme top portion of the tubular top head, the length and width of each slot being such that different rakes each with a different number and spacing of its tines may respectively be insertable therein, and said tines extending through and beyond the hollow top head enabling the bottom edge of the blade to contact adjacent tines of a rake.

* * * * *